United States Patent
Joinson et al.

(10) Patent No.: US 10,628,621 B2
(45) Date of Patent: Apr. 21, 2020

(54) COMPONENT LIFING

(71) Applicant: ROLLS-ROYCE plc, London (GB)

(72) Inventors: Martin B Joinson, Bristol (GB); Ian C Booth, Bristol (GB)

(73) Assignee: ROLLS-ROYCE plc, London (GB)

( * ) Notice: Subject to any disclaimer, the term of this patent is extended or adjusted under 35 U.S.C. 154(b) by 215 days.

(21) Appl. No.: 15/484,661

(22) Filed: Apr. 11, 2017

(65) Prior Publication Data

US 2017/0323040 A1 Nov. 9, 2017

(30) Foreign Application Priority Data

May 9, 2016 (GB) .................................. 1608047.5

(51) Int. Cl.
*G06F 30/23* (2020.01)
*G06F 30/20* (2020.01)
*G06F 11/36* (2006.01)
*G05B 23/02* (2006.01)
*G06F 111/20* (2020.01)

(52) U.S. Cl.
CPC .............. *G06F 30/23* (2020.01); *G06F 30/20* (2020.01); *G05B 23/0283* (2013.01); *G06F 11/3676* (2013.01); *G06F 2111/20* (2020.01)

(58) Field of Classification Search
USPC ...................................................... 703/2, 5, 6
See application file for complete search history.

(56) References Cited

U.S. PATENT DOCUMENTS

| 8,116,990 | B2* | 2/2012 | Koul | G05B 23/0283 |
| | | | | 324/548 |
| 9,841,756 | B2* | 12/2017 | Patel | G05B 23/0283 |
| 9,869,722 | B1* | 1/2018 | Morris | G01R 31/343 |
| 2006/0224325 | A1* | 10/2006 | Conway | G06Q 10/04 |
| | | | | 702/19 |
| 2009/0265118 | A1 | 10/2009 | Guenther et al. | |

(Continued)

FOREIGN PATENT DOCUMENTS

WO 2015/086957 A2 6/2015

OTHER PUBLICATIONS

Oct. 5, 2016 Search Report issued in British Patent Application No. GB1608047.5.
(Continued)

*Primary Examiner* — Thai Q Phan
(74) *Attorney, Agent, or Firm* — Oliff PLC

(57) ABSTRACT

A method of lifing a mechanical component is provided. The method includes: (a) providing a model of the component in which the component is divided into a plurality of regions, and (b) performing consecutively, for each of a consecutive series of actual or virtual missions, the sub-steps of: (b-i) determining the number of operational cycles in the most recent actual or virtual mission for each region, (b-ii) determining a respective unmodified additional cumulative risk associated with each region, (b-iii) determining a respective modified additional cumulative risk associated with each region, (b-iv) determining an updated total modified cumulative risk associated with each region, and (b-v) summing the updated total modified cumulative risks of the regions to determine a modified risk of failure of the component.

5 Claims, 4 Drawing Sheets

(56) References Cited

U.S. PATENT DOCUMENTS

| | | | |
|---|---|---|---|
| 2011/0137575 A1* | 6/2011 | Koul | G05B 23/0245 702/34 |
| 2015/0186568 A1 | 7/2015 | Anfriani et al. | |
| 2016/0093115 A1* | 3/2016 | Ahn | G06N 7/005 701/29.3 |
| 2016/0246287 A1* | 8/2016 | Modgil | G05B 23/0245 |
| 2016/0328315 A1* | 11/2016 | Rajamanickam | G06F 11/3676 |
| 2016/0349723 A1* | 12/2016 | Patel | G05B 23/0283 |
| 2017/0109265 A1* | 4/2017 | Rajamanickam | G06F 11/3676 |

OTHER PUBLICATIONS

Sep. 5, 2017 Search Report issued in European Patent Application No. 17165880.

R.C. McClung et al. "A Software Framework for Probabilistic Fatigue Life Assessment of Gas Turbine Engine Rotors". Probabilistic Aspects of Life Prediction, Journal of ASTM International, Sep. 2004, vol. 1, No. 8, pp. 199-215.

S.J. Hudak et al. "Enhanced Life Prediction Technology for Engine Rotor Life Extension (ERLE)". Sep. 2008, pp. i-153.

Justin Wu et al. "Efficient and Accurate Methods for Probabilistic Analysis of Titanium Rotors". 8th ASCE Specialty Conference on Probabilistic Mechanics and Structual Reliability, Jul. 26, 2000, pp. 1-6.

* cited by examiner

COMPONENT LIFING

FIELD OF THE INVENTION

The present invention relates to methods and systems for component lifing.

BACKGROUND OF THE INVENTION

Component lifing is a process of determining an estimated operational lifetime of a component. In the aviation industry, lifing of engine components is crucial to integrity and mission safety. Various certification bodies certify approved lifetimes of engine components after which there is an unacceptable probability of component failure (e.g. through material fatigue or material anomaly) and there is the requirement that the engine component is repaired or replaced at or before the end of the approved lifetime. Other industries also analyse operational lifetimes by component lifing.

The approved lifetime of engine components is typically calculated from a finite element analysis (FEA) of the stresses and temperatures experienced by the engine component during a theoretical certification mission.

In the FEA of the engine component, a model of the component is divided into a number of finite elements, each of which has nodes with defined material properties so that any applied load will give a predictable corresponding displacement of the element. Complex designs are made up as an assembly of elements, called a mesh, to which restraints/constraints and loads may be applied. During the FEA, a series of simultaneous equations are set up which represent the overall mechanical behaviour of the model, and these are solved, giving the nodal displacements resulting from the applied loads.

Rig tests on actual engine components are then used to validate the theoretical prediction obtained from the FEA.

One problem with the known methods/systems is that the theoretical operating conditions attributed to the certification mission may differ considerably from the actual operating conditions experienced by the part in service. Where the actual operating conditions are harsher than the theoretical operating conditions, failure of the part may occur earlier than predicted which could have catastrophic effects. Where the actual operating conditions are less harsh than the theoretical operating conditions, the part may be replaced sooner than is necessary with undesirable financial implications for the operator.

Another problem is that the methods/systems are time-consuming. As a consequence, typically, the FEA is carried out for one or two certification missions, but is too slow to be used with actual in service data.

SUMMARY OF THE INVENTION

Accordingly, there is a need for methods and systems which provide faster and more accurate lifing. There is also a need for methods and systems which can be used with actual measured data so that the life associated with any actual or virtual (i.e. modelled) mission can be calculated and compared to the life from a certification mission. This comparison is known as the "exchange rate" X and can be expressed as Nref/Nactual where Nref is the life expressed as number of a particular certification mission (i.e. a predetermined standard mission) and Nactual is the life expressed as number of actual or virtual missions.

An exchange rate greater than 1 therefore represents more arduous actual or virtual missions and an exchange rate less than 1 less arduous actual or virtual missions.

Thus, in a first aspect, the present invention provides a computer-based method of lifing a mechanical component, the method including performing the steps of:

(a) providing a model of the component in which the component is divided into a plurality of regions, for each region the model determining a respective cumulative risk R which is the probability that the region has a defect multiplied by the probability that that defect causes failure of the component, the cumulative risk R being determined by the model for the region as a respective function F(N) of a number N of operational cycles of a predetermined standard mission; and (b) performing consecutively, for each of a consecutive series of actual or virtual missions, the sub-steps of:

(b-i) determining the number $N^*_a$, of operational cycles in the most recent actual or virtual mission for each region, (b-ii) determining a respective unmodified additional cumulative risk associated with each region $F(N^*_a)$, (b-iii) determining a respective modified additional cumulative risk associated with each region as $X \cdot F(N^*_a)$, where X is the exchange rate for the combination of the selected region, the actual or virtual mission, and the predetermined standard mission, (b-iv) determining an updated total modified cumulative risk associated with each region by adding the modified additional cumulative risk associated with the region to an existing total modified cumulative risk associated with the region due to the previous actual or virtual missions in the series, and (b-v) summing the updated total modified cumulative risks of the regions to determine a modified risk of failure of the component.

Advantageously, by applying exchange rates to different regions of the model, which exchange rates vary depending on the actual or virtual engine missions, it is possible quickly and accurately to determine component lives.

Further aspects of the present invention provide: a computer program comprising code which, when run on a computer, causes the computer to perform the method of the first aspect; a computer readable medium storing a computer program comprising code which, when run on a computer, causes the computer to perform the method of the first aspect; and a computer system programmed to perform the method of the first aspect. For example, a computer system can be provided for lifing a mechanical component, the system including: a computer-readable medium or media storing: a model of the component in which the component is divided into a plurality of regions, for each region the model determining a respective cumulative risk R which is the probability that the region has a defect multiplied by the probability that that defect causes failure of the component, the cumulative risk R being determined by the model for the region as a respective function F(N) of a number N of operational cycles of a predetermined standard mission, and one or more processors operatively connected to the computer-readable medium or media and configured to perform consecutively, for each of a consecutive series of actual or virtual missions, the sub-steps of: (i) determining the number $N^*_a$ of operational cycles in the most recent actual or virtual mission for each region, (ii) determining a respective unmodified additional cumulative risk associated with each region $F(N^*_a)$, (iii) determining a respective modified additional cumulative risk associated with each region as $X \cdot F(N^*_a)$, where X is the exchange rate for the combination of the selected region, the actual or virtual mission, and the predetermined standard mission, (iv) determining an updated total modified cumulative risk associated with each region by adding the modified additional cumulative risk associated with the region to an existing total modified cumulative risk associated with the region due to the previous actual or virtual missions in the series, and (v) summing the updated total modified cumulative risks of the regions to determine a modified risk of failure of the component. The system thus corresponds to the method of the first aspect.

A further aspect of the present invention provides a method of operating a gas turbine engine, the method including:

performing a consecutive series of actual or virtual engine missions; and performing the method of the first aspect in respect of the engine missions for one or more components of the engine to determine risks of failure of the components. The components of the engine can then be replaced when their risks of failure reach respective predetermined target risks.

Optional features of the invention will now be set out. These are applicable singly or in any combination with any aspect of the invention.

Conveniently, the method may further include performing the sub-steps of:

(b-vi) determining an updated total unmodified cumulative risk associated with each region by adding the unmodified additional cumulative risk associated with the region to an existing total unmodified cumulative risk associated with the region due to the previous actual or virtual missions in the series, and (b-vii) summing the updated total unmodified cumulative risks of the regions to determine an unmodified risk of failure of the component; and the step of:

(c) comparing the modified risk of failure of the component with the unmodified risk of failure of the component to determine an overall component exchange rate which is the number of the predetermined standard missions that would produce the modified risk of failure.

The mechanical component may be part of an engine such as a gas turbine engine. The predetermined standard mission can then be a predetermined standard mission of the engine. Further, the actual or virtual missions can be actual or virtual engine missions.

However, the component may be part of another kind of system, such as a nuclear reactor or a power system.

Actual missions can be measurements from in-service operation. Virtual engine missions can be results of theoretical analysis.

The method may include a step, before step (b), of providing, for each region of the model, respective exchange rates X for a plurality of possible actual or virtual missions relative to the predetermined standard mission.

Each region may be subdivided into a number Z of zones, the respective function for each region being of the form $F(N)=f1(N)+f2(N)+ \ldots fZ(N)$, where each $f(N)$ determines the cumulative risk R for the respective zone. In this way more accurate lifings can be calculated, although at the expense of additional computing time. The zones can correspond, for example, to the elements of an FEA model of the component.

The component may be a rotating component, such as a rotor disc, but may be applied to any lifed part.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
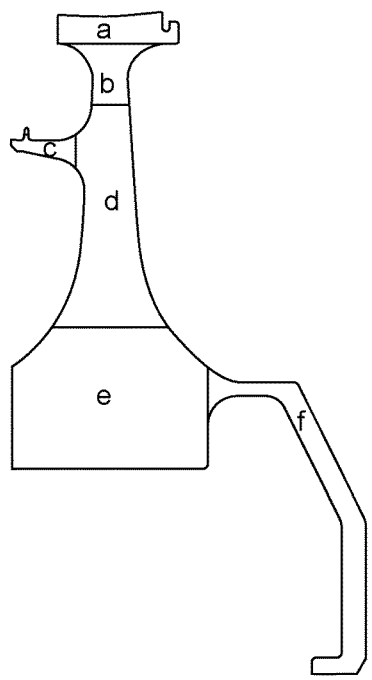
FIG. 1 shows schematically a gas turbine engine component divided into regions.

FIG. 1 shows schematically a gas turbine engine component 1 divided into regions $r_a$-$r_f$. The regions are associated with respective functions $F_a$-$F_f$ from which respective cumulative risks $R_a$-$R_f$ can be calculated, each cumulative risk being the probability that that region has a defect multiplied by the probability that that defect causes failure of the component. $F_a$-$F_f$ are functions of a number N of operational cycles of a predetermined standard mission of the engine. For example, a standard mission can be a civil aircraft flight plan which having a particular day temperature, take off and climb ratings, stage length etc., and which is expected to be a conservative representation of typical service operation.

The present invention involves the use of exchange rates to determine the cumulative risks of the regions of the component when the engine undergoes operational cycles which typically are not cycles of the predetermined standard mission. More particularly, the exchange rates allow cumulative risks calculated for operational cycles of one mission to be applied to operational cycles of other missions.

Figure 2:
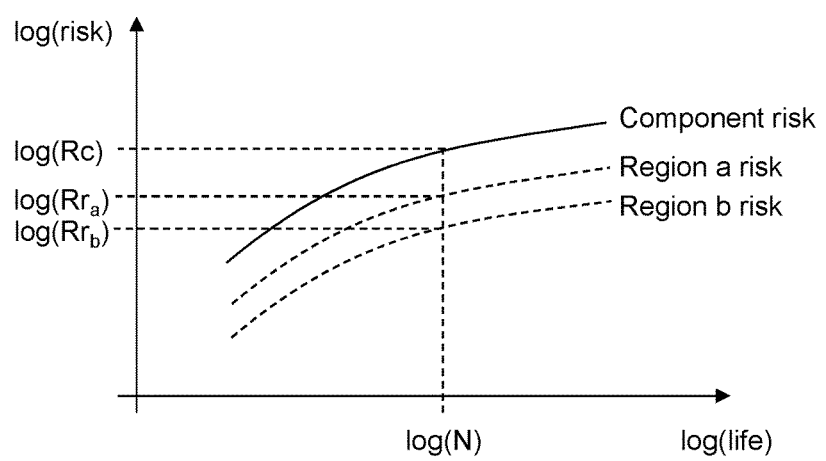
FIG. 2 is a schematic log-log graph of risk against life and shows plots for the two regions of a component as well as a plot for the entire component.

The calculation of component risk at a given life (i.e. given number of operation cycles N of the predetermined standard mission) is illustrated FIG. 2 for a component having just two regions $r_a$ and $r_b$. Log of life is plotted against log of risk for each region. These risks are combined to give the component risk. For each region, the log(risk) vs. log(life) curve can be defined by the probability of failure and the slope at the declared life. In this way, the cumulative risk R for each region is determined as a respective function F(N) of the number N of operational cycles.

Figure 3:
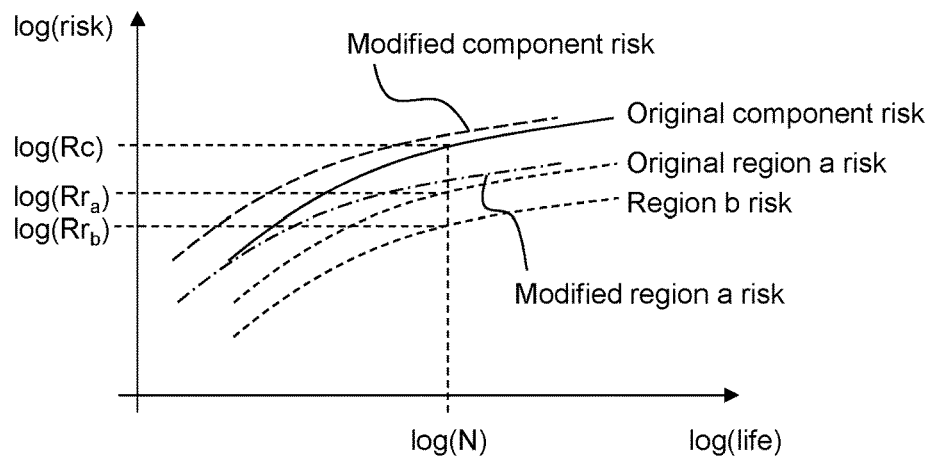
FIG. 3 shows the graph of FIG. 2 in which the risk is modified for one of the regions and thus for the component.

To account for deviation from the standard mission in the calculation of component risk, the risk vs. life curves for each region are first adjusted to include the effect of exchange rates X. For example, if the standard mission equates 1.0 operational cycles with one mission, but the exchange rate for region $r_a$ in respect of a certain non-standard mission is equivalent to 2.0 operational cycles per mission, then the risk at N missions is the risk from the region $r_a$ risk vs. life curve at 2.0*N cycles. On the log-log plot of FIG. 2, this has the effect of shifting the region $r_a$ risk curve to the left. The component risk at any life measured in cycles N can then be calculated as the combination of the region risks, including any modifications for exchange rates, as illustrated in FIG. 3. The principle of the present invention is independent of the details of the lifing model for each region. The exchange rates for the regions can come, for example, from a simple fracture mechanics area or from a more complicated analysis that takes into account the incubation time of an anomaly as well as the time for a crack to propagate to failure.

Figure 4:
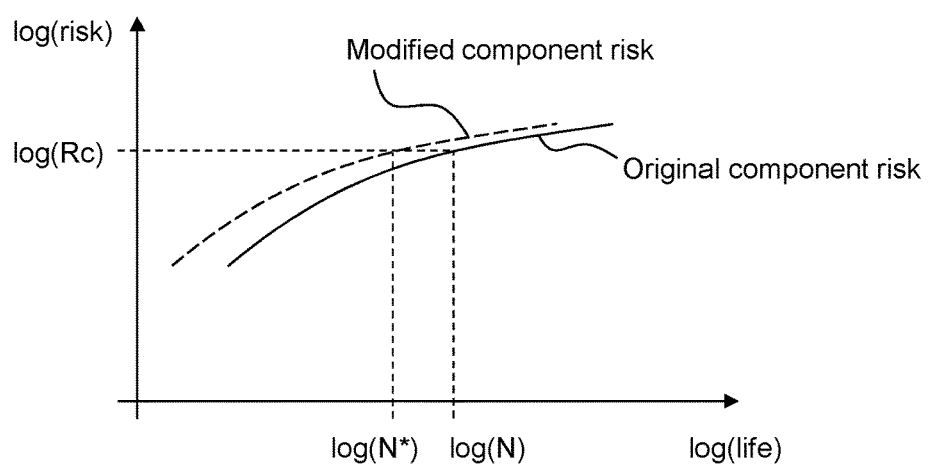
FIG. 4 shows the component risk and modified component risk of FIG. 3.

As illustrated in FIG. 4, if the current life based on component risk is N cycles, at a risk of Rc, then the equivalent life N* cycles taking into account the effect of exchange rates can be calculated from the modified component risk curve at the life from this curve that gives the same risk Rc. The effective exchange rate for the component can also be calculated as the ratio of the component life at a risk of Rc calculated with and without the exchange rates, i.e. N/N*.

Figure 5:
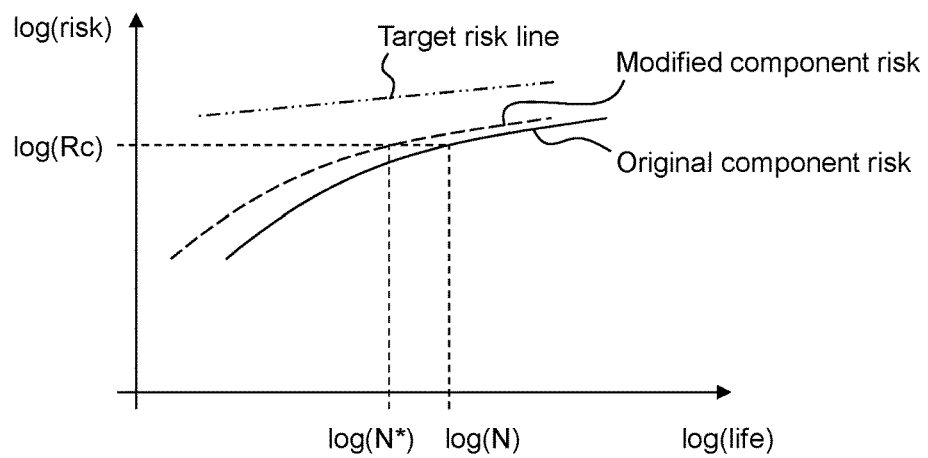
FIG. 5 shows the graph of FIG. 4 including a target risk line.

The overall exchange rate calculated in this way allows the cumulative risk to be limited at the same level as that of a certification analysis, but at a different risk per mission if any of the region exchange rates do not equal 1. Alternatively, a revised value of released life can be calculated from the modified component risk curve at a life that gives the same failure rate as the value of the released life from the original component risk curve. To keep the failure rate constant, the target value of risk varies with life. For example, if the life is halved, then to have the same failure rate the risk must also be halved at this life. FIG. 5 shows the graph of FIG. 4 now including a target risk line, noting that the target risk line has a positive slope because there is an acceptable, although small, risk of failure for each mission.

The exchange rate for each mission can be output and a cumulative total maintained until the approved life is reached.

The present invention is based on a recognition that the relative damage of individual missions may be a long way from a certification profile, but in general all that matters is the average over the lifetime, so that the analysis can be simplified to moving up and down a relatively small proportion of the component risk curve. Similarly, while different regions of a component (e.g. the rim and bore regions of a rotor disc) may have different thermo-mechanical responses and hence require different analyses (e.g. different FEA models), adjacent elements (e.g. FEA elements) will typically have similar usage rates, so the usage monitoring can be based on a relatively small number of regions (typically numbering in the tens), rather than the hundreds or thousands of elements that might be used in the certification analysis.

The lifing method of the present invention can be applied to an actual or a virtual engine. In the method, firstly a model of the component is provided. The model is typically based on a certification FEA model. In the model, the component is divided into a relatively small number of regions, each containing many FEA elements. The boundaries of each region are set such that the parts of the component within each region have similar usage rates. Each region is associated with a respective model F(N) which determines the cumulative risk R for the region as a function of the number N of operational cycles of a predetermined standard mission of the engine.

Next, for each of a consecutive series of actual or virtual engine missions, the following sub-steps are performed:

Determine the number of operational cycles in the most recent mission (whether actual or virtual), Determine a respective additional cumulative risk associated with each region as $F(N^*_a)$.

Determine a respective modified additional cumulative risk associated with each region as $X \cdot F(N^*_a)$, where X is the exchange rate for the combination of that region, the most recent mission, and the predetermined standard mission.

Determine an updated total cumulative risk associated with each region by adding the modified additional cumulative risk associated with the region to an existing total cumulative risk associated with the region due to the previous engine missions in the series.

Sum the updated total cumulative risks of the regions to determine a risk of failure of the component.

In this way, the method provides probabilistic usage monitoring that gives answers which are close to the answers that a full theoretical certification standard FEA analysis would give. However, with current computer systems, the answers can be provided in seconds rather than days, so that the approach is practical to use with actual or virtual operational data.

Figure 6:
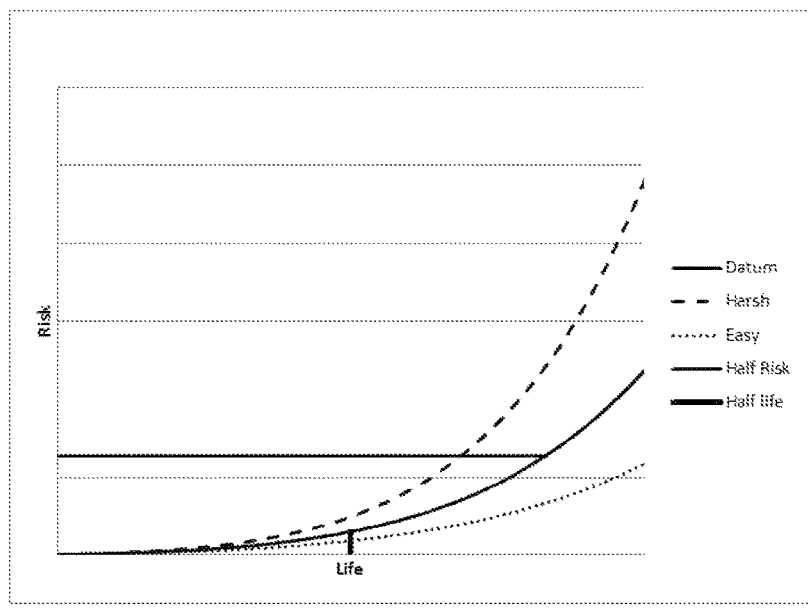
FIG. 6 shows typical risk versus life curves for "harsh", "datum" (i.e. standard) and "easy" missions.

With a conventional certification analysis, the risk per mission increases from essentially 0 for a new component up to the acceptable risk ceiling at component retirement even for identical missions, and half risk is reached long after half-life. This is illustrated in FIG. 6, which shows schematically typical risk-life relationships for "datum" (i.e. standard), "harsh" and "easy" missions. If this were replicated in a system supplied to operators it would be difficult to distinguish a normally expected increase in risk through a component's lifetime from an increase in operational severity. Similarly the non-linear nature of risk vs life would make projections of remaining useful life difficult.

Figure 7:
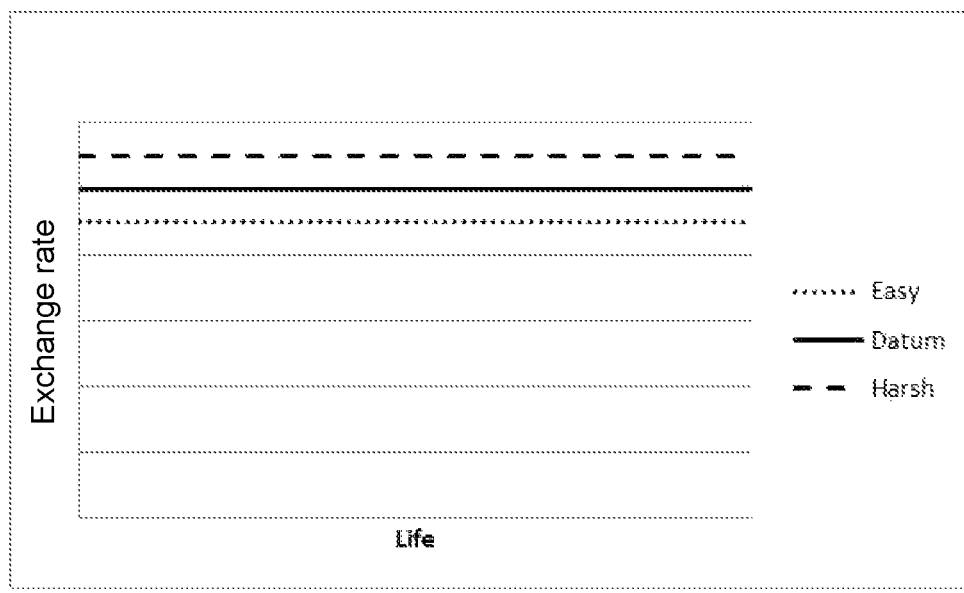
FIG. 7 shows typical exchange rates for the missions from FIG. 6.

With the approach of the present invention, if the operator were to fly exactly the same mission repeatedly they would see the same exchange rate, so they can spot trends of rising or falling operational severity. This is illustrated in FIG. 7, which shows schematically exchange rates against life for the missions of FIG. 6. Similarly, when the cumulative total is at half the released life there is half-life remaining.

To refine the method further, each region can be subdivided into a number Z of zones. These zones can correspond, for example, to the elements of the FEA model. Each zone can then be associated with a respective function f, such that the model F(N) which determines the cumulative risk R for the region is defined as $F(N)=f_1(N)+f_2(N)+ \ldots f_Z(N)$. This refined approach can provide more accurate updated total cumulative risks, although at the cost of additional computing time.

The method described above may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As disclosed herein, the term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

While the invention has been described in conjunction with the exemplary embodiments described above, many equivalent modifications and variations will be apparent to those skilled in the art when given this disclosure. For example, although described in respect of a gas turbine engine, the component can be part of another system, such as a nuclear power plant. Accordingly, the exemplary embodiments of the invention set forth above are considered to be illustrative and not limiting. Various changes to the described embodiments may be made without departing from the spirit and scope of the invention.

The invention claimed is:

1. A method of operating a gas turbine engine, the method including:

performing a consecutive series of actual or virtual engine missions;

performing a computer-based method of lifting a mechanical component, in respect of the engine missions for a component of the engine to determine risks of failure of the component, the method of lifting comprising:

(a) providing a model of the component in which the component is divided into a plurality of regions ($r_a$-$r_f$), for each region the model determining a respective cumulative risk ($R_a$-$R_f$) which is the probability that the region has a defect multiplied by the probability that that defect causes failure of the component, the cumulative risk ($R_a$-$R_f$) being determined by the model for the region as a respective function ($F_a(N)$-$F_f(N)$) of a number N of operational cycles of a predetermined standard mission; and (b) performing consecutively, for each of the consecutive series of actual or virtual missions, sub-steps of:

(b-i) determining a number $N^*_a$ of operational cycles in a most recent actual or virtual mission for each region;

(b-ii) determining a respective unmodified additional cumulative risk associated with each region $F(N^*_a)$;

(b-iii) determining a respective modified additional cumulative risk associated with each region as $X \cdot F(N^*_a)$, where X is an exchange rate for a combination of a selected region, the actual or virtual mission, and the predetermined standard mission that would produce the modified risk of failure;

(b-iv) determining an updated total modified cumulative risk associated with each region by adding the modified additional cumulative risk associated with the region to an existing total modified cumulative risk associated with the region due to a previous actual or virtual missions in the series; and (b-v) summing the updated total modified cumulative risks of the regions to determine a modified risk of failure of the component; and replacing the component of the engine when its risk of failure reaches a predetermined target risk.

2. A method according to claim 1, wherein the method of lifting includes performing sub-steps of:

(b-vi) determining an updated total unmodified cumulative risk associated with each region by adding the unmodified additional cumulative risk associated with the region to an existing total unmodified cumulative risk associated with the region due to the previous actual or virtual missions in the series; and (b-vii) summing the updated total unmodified cumulative risks of the regions to determine an unmodified risk of failure of the component; and the step of:

(c) comparing the modified risk of failure of the component with the unmodified risk of failure of the component to determine an overall component exchange rate which is a number of the predetermined standard missions that would produce the modified risk of failure.

3. The method according to claim 1, wherein each region is subdivided into a number Z of zones, the respective function for each region being of the form $F(N)=f_1(N)+f_2(N)+\ldots f_Z(N)$, where each f(N) determines the cumulative risk R for the respective zone.

4. The method according to claim 1, wherein the component is a rotating component.

5. A non-transitory computer readable medium storing a computer program comprising code which, when run on a computer, causes the computer to perform the method of claim 1.

* * * * *